(12) United States Patent
Tiberi et al.

(10) Patent No.: US 10,133,900 B2
(45) Date of Patent: Nov. 20, 2018

(54) CONTROLLING THE OUTPUT OF CONTEXTUAL INFORMATION USING A COMPUTING DEVICE

(71) Applicant: PHILIPS LIGHTING HOLDING B.V., Eindhoven (NL)

(72) Inventors: Luca Tiberi, Eindhoven (NL); Paul Anthony Shrubsole, Eindhoven (NL); Maurice Herman Johan Draaijer, Eindhoven (NL); Ralf Gertruda Hubertus Voncken, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/521,456

(22) PCT Filed: Oct. 20, 2015

(86) PCT No.: PCT/EP2015/074193
§ 371 (c)(1),
(2) Date: Apr. 24, 2017

(87) PCT Pub. No.: WO2016/066470
PCT Pub. Date: May 6, 2016

(65) Prior Publication Data
US 2017/0316240 A1 Nov. 2, 2017

(30) Foreign Application Priority Data

Oct. 30, 2014 (EP) ..................................... 14190994

(51) Int. Cl.
*G06F 17/00* (2006.01)
*G06K 7/14* (2006.01)
(Continued)

(52) U.S. Cl.
CPC ....... *G06K 7/1417* (2013.01); *G06K 7/10297* (2013.01); *G06K 7/1413* (2013.01); *G06Q 10/20* (2013.01)

(58) Field of Classification Search
CPC . G06K 7/1414; G06K 7/10297; G06K 7/1413
(Continued)

(56) References Cited

U.S. PATENT DOCUMENTS

2003/0083789 A1 5/2003 Kalley
2007/0048702 A1 3/2007 Jang et al.
(Continued)

FOREIGN PATENT DOCUMENTS

EP 2784631 A1 10/2014
JP 06314318 A 11/1994
(Continued)

OTHER PUBLICATIONS

"Wearable Computer,Wikipedia, the free encyclopedia", Oct. 26, 2014 (Oct. 26, 2014), XP055173757, URL: http://en.wi kipedia.org/w/index.php?title=Wearable_computer&oldid=631184466.
(Continued)

*Primary Examiner* — Karl D Frech (57) ABSTRACT

A method for controlling the output of contextual information to assist a user to perform a sequence of activities using a computing device, the computing device comprising or coupled to at least one wearable sensor and at least one output device for providing contextual information, the method comprising: identifying, using sensor information from the at least one sensor, an activity being performed by the user; selecting and controlling the output of contextual information based on the activity being performed by the user, the contextual information being output from the at least one output device to a user to assist the user in performing the identified activity.

13 Claims, 5 Drawing Sheets

(51) Int. Cl.
*G06Q 10/00* (2012.01)
*G06K 7/10* (2006.01)

(58) Field of Classification Search
USPC .......................................... 235/375, 380, 382
See application file for complete search history.

(56) References Cited

U.S. PATENT DOCUMENTS

2011/0282594 A1* 11/2011 Vock .................. G01P 3/50
702/44
2013/0307764 A1    11/2013 Denker et al.
2013/0346168 A1    12/2013 Zhou et al.

FOREIGN PATENT DOCUMENTS

JP          2009237801  A      10/2009
JP          2011118683  A       6/2011

OTHER PUBLICATIONS

Solar Installation through the Google Glass Lens. http://www.greentechmedia.com/articles/read/Solar-Installation-Through-the-Google-Glass-Lens.
http://www.vrealities.com/motion-trackers.
Dave Altavilla, "Surgeon Uses Google Glass and iPad to Capture Live Procedure and Streams It to a Hangout". http://hothardware.com/News/Surgeon-Uses-Google-Glass-and-iPad-To-Capture-Live-Procedure-and-Streams-It-To-a-Hangout/#ixzz2yphjhGxy.

\* cited by examiner

CONTROLLING THE OUTPUT OF CONTEXTUAL INFORMATION USING A COMPUTING DEVICE

CROSS-REFERENCE TO PRIOR APPLICATIONS

This application is the U.S. National Phase application under 35 U.S.C. § 371 of International Application No. PCT/EP2015/074193, filed on Oct. 20, 2015 which claims the benefit of European Patent Application No. 14190994, filed on Oct. 30, 2014. These Applications are hereby incorporated by reference herein.

FIELD OF THE INVENTION

This invention is generally related to a method and apparatus for controlling the output of contextual information using a computing device, and in particular but not only a method and apparatus for controlling output of contextual information using a computing device for assisting a user of the device to perform a sequence of activities such as lighting installation activities.

BACKGROUND OF THE INVENTION

Modern electrical, mechanical and plumbing systems are often complex systems which are difficult to install, maintain, and dismantle without significant knowledge of the specific system. A significant amount of effort and time is being invested in creating systems which are easy to install, maintain and dismantle. For example such systems often come with large quantity of installation, operation, and maintenance information often in electronic formats. This information can present a step-by step approach of describing activities in a determined sequence in order to attempt to reduce the amount of errors produced operating the activities. It is understood for example that diagnosing and solving errors made during an installation may lead to significantly higher costs and increases the time needed for completing the building/facility and therefore should be avoided where ever possible.

The availability of the information, type of information and ease of use of this information are all key to reducing errors in these situations. For example installations such as lighting installations may be documented by on-site paper format installation plans. These paper plans are furthermore often on large unwieldy format such as A0 size paper installation plans. Furthermore paper documents such as installation manuals and datasheets of devices are difficult to use and may be easily damaged in some environments. As indicated more recently electronic installation manuals and searchable datasheets of devices have been made available to view from a smart device. These smart devices, such as smartphones and tablets, may also be used to receive and view interactive videos/manuals to assist in the activities or sequences of activities such as installation, operation or maintenance of such systems.

Operating these smart devices typically requires a physical interaction (e.g. touch, swipe etc.). As such while the devices can be useful in preparation and reviewing activities they are less useful or become pointless in scenarios in which the installer needs to use both hands in the activity and thus cannot control the smart device.

Wearable smart-devices or wearable computing devices can help users such as installers to receive information at the right time. Innovative user interfaces associated with the wearable smart-devices, for example smart wearable glasses (Google Glass), or smart wearable watches (SmartWatch), can assist in delivering contextual information to the user by making use of embedded sensors such as cameras, pressure-sensors, light-sensors, ultra sonic sensors, 3D-sensing sensors, gyroscopes, and microphones. These embedded sensors and the user interface enables the wearable smart device to be operated hands-free (e.g. via voice control). These wearable computing devices can also be networked and have access to the internet (either by having stand-alone access or via smartphone/tablet tethering). As such they have access to all the needed information repositories.

This access to information may itself cause problems. A user (for example an installer) may need to regularly switch between types of information on a single device or may need to interact with many different smart devices in order to get the information needed for that particular activity and furthermore control the flow of the information appearing before the user. This may distract the user and allow potential accidents such as electrocution, falling from a height, cuts, burns, or eye injuries to occur.

SUMMARY OF THE INVENTION

The above concern is addressed by the invention as defined by the claims.

According to an embodiment of the invention, there is provided a method for controlling the output of contextual information to assist a user to perform a sequence of activities using a computing device comprising a processor, the computing device comprising or coupled to at least one wearable sensor and at least one output device for providing contextual information, the method comprising, with said processor: receiving sensor information from the at least one wearable sensor worn by said user, identifying, using sensor information from the at least one wearable sensor, an activity of said sequence being performed by the user; based on the identified activity, selecting an output device of the at least one output device; communicating with at least one memory or a further device to retrieve contextual information for the identified activity; and controlling the output of the contextual information by the selected output device to assist the user in performing the identified activity. In such a manner the correct context related information or type of information can be output to the user and furthermore the correct flow of information can be delivered. Moreover, the computing device may be able to access contextual information or data from any suitable source including external sources or further devices such as cloud based information sources. Furthermore these embodiments as discussed herein permit the flow control of this contextual information, the information associated with the identified activity.

In an embodiment, the method further comprises filtering the retrieved contextual information as a function of the selected output device; and wherein the step of controlling the output of the contextual information by the selected output device comprises outputting the filtered contextual information with the selected output device to the user using the computing device. This for instance may be used to remove contextual information formats incompatible with the selected output device, e.g. contextual information including display data and audio data to be provided to a selected audio output device, wherein the display data is filtered out of the contextual information in order to provide the output device with contextual information in a suitable format only, thus reducing the risk of output errors caused by data incompatibility.

The method may further comprise identifying an object using said sensor information; and identifying an activity involving the identified object, wherein the contextual information is based on the identified activity involving the identified object.

Identifying the object may comprise: determining a tag located on the object; and identifying the object from the tag. The object may be easily identified or detected based on some form of tagging of the object. The tag may comprise one of: a QR code sticker; a barcode; a NFC tag.

Identifying, using sensor information from the at least one wearable sensor, an activity being performed by the user may further comprise identifying an activity progress using said sensor information; and wherein the selecting an device of the at least one output device and controlling the output of contextual information by the selected output device to assist the user in performing the identified activity, may further is at least partially based on the identified activity progress.

The step of selecting an output device of the at least one output device and controlling the output of the contextual information by the selected output device to assist the user in performing the identified activity may be further based on a user input.

The method may further comprise receiving at least one user input from the at least one sensor or a user input device.

Controlling the output of the contextual information by the selected output device may further comprise adapting an output speed of the contextual information.

Controlling the output of the contextual information by the selected output device may further comprise identifying and focusing on an element of the contextual information.

Controlling the output of the contextual information by the selected output device may further comprise controlling the flow direction of the contextual information.

Identifying, using sensor information from the at least one wearable sensor, an activity being performed by the user may comprise: identifying a feature or feature pattern in the sensor information; and using the identified feature or feature pattern to identify the activity.

The at least one sensor may be a camera and wherein identifying, using sensor information from the at least one wearable sensor, an activity being performed by the user may comprise: capturing an image using the camera; identifying within the image a feature; and using the identified feature to identify the activity.

The at least one sensor may be a microphone and wherein identifying, using sensor information from the at least one wearable sensor, an activity being performed by the user may comprise: capturing an audio signal using the microphone; identifying within the audio signal an audio feature produced by the activity; and using the identified audio feature to identify the activity.

The at least one output device may be a head mounted display and wherein selecting an output device of the at least one output device and controlling the output of the contextual information by the selected output device to assist the user in performing the identified activity may comprise outputting at least one image to the user via the head mounted display, the at least one image being at least one image in such a manner to assist the user to reach the next activity in the sequence of activities. The image may comprise text.

The at least one output device may be an audio transducer and wherein selecting an output device of the at least one output device and controlling the output of the contextual information by the selected output device to assist the user in performing the identified activity may comprise outputting auditory instructions to the user via the audio transducer, the auditory instructions being instructions in such a manner to assist the user to reach the next activity in the sequence of activities.

The method may further comprise testing a correct performing of the sequence of activities by verifying a progression of activities within the sequence of activities.

The computing device may comprise a first part comprising the at least one wearable sensor, and a separate second part comprising a processor part for performing the method as described herein, wherein the method may further comprise communicating information from the first part of the computing device to the second part of the computing device.

A computer program product may comprise a computer-readable medium embodying computer program code for implementing the steps of the method as described herein when executed on a processor of a computing device further comprising or coupled to at least one sensor and at least one output device for providing contextual information.

A computing device may comprise: the computer program product as described herein; a processor adapted to execute the computer program code; at least one sensor; and at least one output device for providing contextual information.

According to a second aspect there is provided a computing device for controlling the output of contextual information to assist a user to perform a sequence of activities, the computing device comprising: at least one processor and at least one memory including computer program code for one or more programs, the at least one memory and the computer program code configured to, with the at least one processor, cause the computing device to at least to: identify, using sensor information from at least one wearable sensor, an activity being performed by the user; select and control the output of contextual information based on the activity, the contextual information being output from the output device to a user to assist the user in performing the identified activity.

The computing device may comprise or be coupled to at least one sensor. The computing device may comprise or be coupled to at least one output device.

According to a third aspect there is provided a computing device for controlling the output of contextual information to assist a user to perform a sequence of activities, the computing device comprising: an activity identifier configured to identify, using sensor information from at least one sensor, an activity being performed by the user; a contextual information controller configured to based on the activity being performed by the user, select an output device, communicate with at least one memory or a further device to retrieve contextual information for the identified activity, and control the output of contextual information by the selected output device to assist the user in performing the identified activity.

The computing device may comprise the at least one wearable sensor. The computing device may be coupled to at least one wearable sensor. The computing device may comprise at least one output device configured to provide the contextual information to the user. The computing device may be coupled to at least one output device configured to provide the contextual information to the user.

The computing device may comprise an object identifier configured to identify an object using the sensor information, wherein the activity identifier may be further configured to identify an activity involving the object and the contextual information controller may be further configured to select the output device and control the output of contextual information by the selected output device based on the identified activity involving the object.

The computing device may further comprise: a transceiver configured to communicate with at least one memory or a further device to retrieve the contextual information based in the identified activity.

The object identifier may be configured to determine a tag located on the object; and identify the object from the tag.

The tag may comprise one of: a QR code sticker; a barcode; a NFC tag.

The activity identifier may further be configured to identify an activity progress using said sensor information; and the contextual information controller may be further configured to select an output device of the at least one output device and control the output of the contextual information by the selected output device to assist the user in performing the identified activity at least partially based on the identified activity progress.

The contextual information controller may further be configured to select an output device of the at least one output device and control the output of the contextual information by the selected output device based on a user input.

The contextual information controller may further be configured to receive at least one user input from the at least one sensor or a user input device.

The contextual information controller may further be configured to adapt an output speed of the contextual information.

The contextual information controller may further be configured to identify and focus on an element of the contextual information.

The contextual information controller may further be configured to control the flow direction of the contextual information.

The activity identifier may be configured to: identify a feature or feature pattern from the at least one sensor; and use the identified feature or feature pattern to identify the activity.

The at least one sensor may be a camera and wherein the activity identifier may be configured to: receive a captured image using the camera; identify within the image a position or feature of the object; and use the identified position or feature of the object to identify the activity.

The at least one sensor may be a microphone and wherein the activity identifier may be configured to: receive an audio signal from the microphone; identify within the audio signal an audio feature generated by the performing of the activity; use the identified audio feature to identify the activity.

The at least one output device may be a head mounted display and wherein the contextual information controller may be configured to output at least one image to the user via the head mounted display, the at least one image being at least one in such a manner to assist the user to reach the next activity within the sequence of activities. The image may comprise text.

The at least one output device may be an audio transducer and wherein the contextual information controller may be configured to output auditory instructions to the user via the audio transducer, the auditory instructions being instructions in such a manner to assist the user to reach the next activity within the sequence of activities.

The computing device may comprise a sequence verifier configured to test a correct performing of the sequence of activities by verifying a progression of activities within the sequence of activities.

The computing device may comprises a first part comprising the at least one sensor, and a separate second part comprising a processor part, the computing device further configured to communicate information from the first part of the computing device to the second part of the computing device.

The contextual information controller may be configured to control or select at least one of: an audio transducer configured to output audio contextual information; a display configured to output image contextual information; a display configured to output image contextual information over a captured image of an users field of view; a transparent, partially opaque or translucent display configured to output image contextual information over an users field of view; a tactile transducer configured to output tactile contextual information.

The computing device may further be configured to receive at least one sensor input, wherein the at least one sensor input comprises at least one of: at least one camera image from the viewpoint of the computing device; at least one microphone input; an atmospheric pressure sensor input; a gyroscope/compass sensor input; and a pressure or contact sensor input associated with a garment worn by a user.

The computing device may comprise at least one of: a google glass device; a smart watch; a smartphone; an interactive earplug.

The sequence of activities may be: a sequence of activities for connecting a device or system; a sequence of activities for wiring a device or system; a sequence of activities for configuring a device or system; a sequence of activities for assembling a device or system; a sequence of activities for disassembling a device or system; a sequence of activities for powering a device or system; a sequence of activities for controlling a device/system; and a sequence of activities for linking a device or system to a network.

The computing device may be a wearable computing device. The computing device may comprise at least one wearable sensor. The computing device may be coupled to at least one wearable sensor. The computing device may comprise at least one output device configured to provide the contextual information to the user. The computing device may be coupled to at least one output device configured to provide the contextual information to the user.

The computing device may comprise an object identifier configured to identify, using the sensor information from the at least one sensor, an object.

The computing device may comprise the at least one output device. The computing device may be in communication with the at least one output device located separately from the computing device. The at least one output device may be a wearable output device.

BRIEF DESCRIPTION OF THE DRAWINGS

Examples of the invention will now be described in detail with reference to the accompanying drawings, in which.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

In the context of the present application, a computing device or smart device is a device that provides a user with computing functionality and that can be configured to perform specific computing tasks as specified in a software application (app) that may be retrieved from the Internet or another computer-readable medium. An example computing device may be a wearable computing device. A wearable computing device may be any device designed to be worn by a user on a part of the user's body and capable of performing computing tasks in accordance with one or more aspects of the present invention. Non-limiting examples of such wearable computing devices include smart headgear, e.g. eyeglasses, goggles, a helmet, a hat, a visor, a headband, or any other device that can be supported on or from the wearer's head.

In the context of the present application, a user input for controlling functionality of the computing device may be provided as a tactile input, e.g. a user contacting a user input device of the computing device such as a button, touch pad, touch screen or the like, or may be provided as a sensor input, which sensor input in some embodiments is processed by the computing device to identify the user input. Non-limiting examples of such sensor-based user instructions include gesture recognition, in which case an image sensor may capture an image of the gesture, which gesture is recognized by processing the image, eye movement recognition using an eye tracking sensor, in which case an eye movement-based instruction, e.g. by blinking, eye ball movement and so on, may be detected by an eye tracking sensor and the instruction detected from the processed sensor data, motion detection, e.g. using an accelerometer, gyroscope or another motion sensor to detect a particular type of movement such as a head movement, e.g. a nod or shake of the head or other body part, and interpret the detected motion as a user input, spoken instructions into an audio sensor, and so on. Any suitable sensor-based user input provisioning mechanism may be employed. As such sensor-based user input provisioning is well-known per se, this will not be explained in further detail for the sake of brevity.

The examples described herein describe controlling of contextual information to assist a user of the computing device to perform a lighting installation sequence of activities. However it is understood that the computing device as described herein may be employed to assist a user in any suitable sequence of activities.

Figure 1:
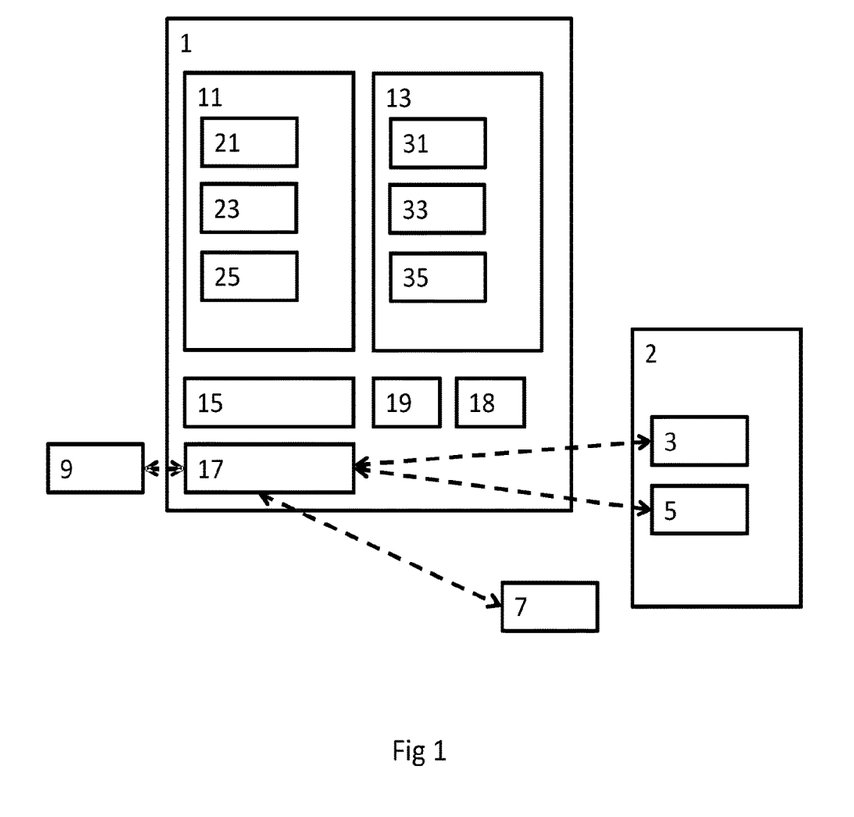
FIG. 1 shows a system comprising an example computing device according to some embodiments.

With respect to FIG. 1 an example system including an example computing device in the form of a wearable computing device 1 according to some embodiments is shown. The wearable computing device 1 is shown in the following example being able to perform a method for controlling the output of contextual information to assist a user of the device to perform a sequence of activities. The wearable computing device 1 is further shown in the following examples as comprising at least one sensor 11 and at least one output device 13 for providing contextual information. Furthermore there is as described as follows a method with the wearable computing device comprising: identifying, using the at least one sensor, an object to be used within the sequence of activities; identifying, using the at least one sensor, a status or progress of an activity with the identified object; and selecting and controlling, based on the status or progress of the activity with the identified object, the output of contextual information, the contextual information being output from the wearable device output device to a user to assist the user in performing the identified activity.

The system comprises a wearable computing device 1. The wearable computing device 1 in the following examples is a smart glasses or head mounted display with integrated sensors device such as sold as the google glass system. However it would be understood that any suitable wearable computing device or wearable smart device can be implemented as the wearable computing device 1. It is understood that the computing device shown in the following examples is an example only of one possible implementation and that the computing device be any suitable computing device and may not be worn by or located on the user. In such embodiments the computing device may be in wireless or wired communication with at least one wearable sensor (or sensor located on the user). Furthermore in some embodiments the output device as described herein may be similarly (wired or wirelessly) coupled or connected to the computing device and as such the output device may or may not be worn by the user or located on the user.

The wearable computing device 1 comprises or is coupled to at least one output device or device 13. For example in some embodiments the wearable computing device 1 comprises a see-through display 33, e.g. a head mounted display. The see-through display 33 makes it possible for a wearer of the wearable computing device 1 to look through the see-through display 33 and observe a portion of the real-world environment of the wearable computing device 1, i.e., in a particular field of view provided by the see-through display 33 in which one or more of the lighting units of the lighting system to be installed are present.

In addition, the see-through display 33 may be operable to display images that are superimposed on the field of view, for example, an image of a desired lighting plan, lighting unit installation tutorials to be applied to the one or more lighting units in the field of view. Such an image may be superimposed by the see-through display 33 on any suitable part of the field of view. For instance, the see-through display 33 may display such an image such that it appears to hover within the field of view, e.g. in the periphery of the field of view so as not to significantly obscure the field of view.

The see-through display 33 may be configured as, for example, eyeglasses, goggles, a helmet, a hat, a visor, a headband, or in some other form that can be supported on or from the wearer's head. The see-through display 33 may be configured to display images to both of the wearer's eyes, for example, using two see-through display units. Alternatively, the see-through display 33 may include only a single see-through display and may display images to only one of the wearer's eyes, either the left eye or the right eye.

A particular advantage associated with such a see-through display 33, e.g. a head mounted display, is that the wearer of the wearable computing device may view an actual site for performing the job, such as a lighting installation site. In other words the wearable computing device may view a space or part thereof where the at least one of the lighting units of the lighting system are to be installed through the see-through display 33. In other words the see-through display 33 is a transparent display, thereby allowing the wearer to view the lighting installation site in real-time.

In some embodiments the see-though display 33 may be substituted or enhanced by a conventional display such as a LCD, LED or organic LED display panel mounted in front of one of the user's eyes.

In some embodiments the wearable computing device 1 may include or be coupled to other output devices 13. For example the wearable computing device 1 may further comprise an output device for producing audio output such as at least one acoustic transducer 31. The acoustic transducers may be air or bone conduction transducers and may be in any suitable form such as earbuds, earphones, or speakers.

In some embodiments the wearable computing device may further comprise or be coupled to an output device for producing a tactile output such as produced by a tactile actuator or vibra 35. The tactile actuator or vibra 35 may for example be configured to vibrate or move a surface in contact with the user which is detected by the user.

Furthermore in some embodiments the wearable computing device further comprises or is coupled to at least one wearable sensor 11. The sensor 11 can be any suitable sensor. For example as shown in FIG. 1 the at least one sensors 11 may comprise at least one microphone or sound sensor 21 configured to capture acoustic signals from the area surrounding the wearable computing device 1. It is understood that in some embodiments there may be more than one microphone and that in some embodiments the microphones are spatially arranged such that directional audio capture is possible. Furthermore in some embodiments the sound sensors or microphones may be configured to enable directional audio signal processing to be performed, for example noise reduction processing. The microphones may be any suitable type of microphone including air conduction or surface contact microphones. The output of the sound sensors 21 may be used for example to detect spoken instructions by the wearer of the wearable computing device 1.

The wearable computing device 1 may further include an image capturing device 23, e.g. a camera, as a sensor. The image capturing device 23 may be configured to capture images of the environment of wearable computing device 1 from a particular point-of-view. The images could be either video images or still images. Specifically, the point-of-view of image capturing device 23 may correspond to the direction in which the see-through display 33 is facing. In this embodiment, the point-of-view of the image capturing device 23 may substantially correspond to the field of view that the see-through display 33 provides to the wearer, such that the point-of-view images obtained by image capturing device 23 may be used to determine what is visible to the wearer through the see-through display 33.

Examples of further sensors 11 which may be employed by the wearable computing device 1 further include at least one motion sensor 25, such as an accelerometer or gyroscope or electronic compass, for detecting a movement of the wearable computing device 1. Such a user-induced movement for instance may be recognized as a command instruction or to assist in determining the current activity being performed by the user as will be explained in more detail below.

However the at least one sensor 11 may comprise any suitable sensor. For example atmospheric pressure sensors configured to identify the user's height based on atmospheric pressure. As previously explained, at least some of the at least one sensor 11 may also be used to detect user inputs for controlling the wearable computing device 1. The wearable computing device 1 may also comprise one or more sensors dedicated to detecting such user inputs, e.g. an eye tracking sensor.

Furthermore in some embodiments the wearable computing device may be provided in the form of separate devices that can be worn on or carried by the user of the computing device. The separate devices that make up computing device system could be communicatively coupled together in either a wired or wireless fashion.

This is shown with respect to FIG. 1 by the system comprising a wearable computing device glove or pair of gloves 2. The glove(s) 2 form part of the wearable computing device system and comprise sensors 3 separate from the wearable computing device 1 main part. An example of a suitable sensor 3 to be embedded within the gloves may be pressure sensors configured to determine whether the user is gripping an object or bend sensors to determine the posture of the user (or the user's hands). The pressure/bend sensors may be implemented by the use of a piezoelectric sensor. The glove(s) 2 furthermore may comprise at least one output device 5, also separate from the wearable computing device 1 main part. For example and example output device 5 may be tactile actuators such as a piezoelectric actuator 5 located at a finger tip of the glove and configured to provide a tactile output. The glove(s) 2 may in some embodiments comprise a further transceiver part configured to transmit and receive data, for example from the wearable computing device 1. Furthermore in some embodiments the glove(s) 2 may further comprise a processor and associated memory for processing and storing sensor data and output device data.

Although the example of glove(s) 2 are provided herein it would be understood that the separate parts may be implements within any suitable garment, such as t-shirt, trousers, shirt, skirt, undergarments, headware or footwear.

In an embodiment, the wearable computing device 1 includes a wireless communication interface 17 or transceiver for wirelessly communicating with other parts of the system, such as the glove(s) 2 shown in FIG. 1. The wireless communication interface 17 may furthermore optionally be configured to wirelessly communicate with further networks, e.g. a wireless LAN, through which the wearable computing device 1 may access a remote data source 9 such as the Internet, or a server and/or a further smart device 7. Alternatively, the wearable computing device 1 may include separate wireless communication interfaces that are able to communicate with the other parts of the wearable computing device and the further networks. The transceiver 17 may be any suitable transceiver such as for example a Wi-Fi transceiver, a mobile data or cellular network transceiver, or a Bluetooth transceiver.

The functioning of wearable computing device 1 may be controlled by a processor 15 that executes instructions stored in a non-transitory computer readable medium, such as data storage 19. The data storage 19 or computer readable storage medium may for example include a CD, DVD, flash memory card, a USB memory stick, a random access memory, a read only memory, a computer hard disk, a storage area network, a network server, an internet server and so on.

The processor 15 in combination with processor-readable instructions stored in data storage 19 may function as a controller of the wearable computing device 1. As such, for example, the processor 15 may be adapted to control the display 33 in order to control what images are displayed by the display 33. The processor 15 may further be adapted to control the wireless communication interface 17.

In addition to instructions that may be executed by processor 15, data storage 19 may store data that may store information on any activities or sequence of activities that are expected to be performed. For instance, the data storage 19 may function as a database of identification information related to the lighting units to be installed, tutorials of how to install the lighting units etc. Such information may be used by the wearable computing device 1 to provide the contextual information as described herein.

The wearable computing device 1 may further include a user interface 18 for receiving input from the user. The user interface 18 may include, for example, a touchpad, a keypad, buttons, a microphone, and/or other input devices. The processor 15 may control at least some of the functioning of wearable computing device 1 based on input received through user interface 18. For example the processor 15 may use the input to control how the see-through display 33 displays images or what images the see-through display 33 displays, e.g. images of a desired lighting site plan selected by the user using the user interface 18.

In some embodiments, the processor 15 may also recognize gestures, e.g. by the image capturing device 23, or movements of the wearable computing device 1, e.g. by motion sensors 25, as control instructions for one or more luminaires, or any other suitable sensor input as previously explained, e.g. user inputs recognized from motion detection, eye movement detection, audio capturing and so on.

In some examples, a gesture corresponding to a control instruction may involve the wearer physically touching an object, for example, using the wearer's finger, hand, or an object held in the wearer's hand. However, a gesture that does not involve physical contact, such as a movement of the wearer's finger, hand, or an object held in the wearer's hand, toward the object or in the vicinity of the object, could also be recognized as a control instruction.

Although FIG. 1 shows various components of wearable computing device 1, i.e., wireless communication interfaces 17, processor 15, data storage 19, one or more sensors 11, image capturing device 23 and user interface 18, as being separate from see-through display 33, one or more of these components may be mounted on or integrated into the see-through display 33. For example, image capturing device 23 may be mounted on the see-through display 33, user interface 18 could be provided as a touchpad on the see-through display 33, processor 15 and data storage 19 may make up a computing system in the see-through display 33, and the other components of wearable computing device 1 could be similarly integrated into the see-through display 33.

The processor 15 functioning as a controller may be configured in some embodiments to receive the sensor information from the sensors 11 and process this sensor information according to instructions or programs stored on the data storage 19 or memory. For example in some embodiments the processor 15 may be configured to process the data from the at least one sensor 11 in order to identify an object to be used within the sequence of activities. The object may be an item used to complete an activity (such as a lighting unit) or an item on which the activity needs to be performed (for example a lighting unit support unit comprising a socket for the lighting unit, a notepad/tablet computer for making a note on). The object may be an item to be installed, for example a lighting unit to be installed according to a lighting plan. The object may be an item to be modified, such as valve or switch to be operated. Furthermore the object may be an item to be removed, such as a broken or faulty lighting unit to be removed and replaced. Furthermore the object may be an item to assist the activity, such as socket set or tool for fixing the lighting unit onto the support unit.

In some embodiments the processor 15 may be configured to identify the object by identifying a tag attached or associated with the object. For example in some embodiments the tag may be a serial number or unique identifier on the object, a QR (Quick Response) code sticker mounted on the object or integrated into the object, a barcode mounted on the object or visible on the surface of the object, or a NFC (Near Field Communication) tag. In such embodiments the processor may be configured to detect or determine a tag from at least one of the sensors (for example within an image captured by the camera 23) and then use the identified tag to identify the object and in some embodiments an activity and/or sequence of activities involving the object. In some embodiments the association may for example be performed by the tag comprising an URI or URL address which is accessed to identify the object and the activity to be performed by the object.

In some embodiments the processor 15 is configured to identify the object by processing the at least one sensor information. For example the processor may be configured to detect or determine from an image captured by the camera 23 an object by pattern recognition or otherwise of the shape, colour or otherwise of the object.

The processor 15 may furthermore be configured to determine or identify an activity being performed by the user. The activity may be one activity from a known or predetermined sequence of activities and may in some embodiments be an activity associated with the object. This for example may be achieved by comparing the sensor information with a lookup table of determined sensor values associated with specific activities. In order to assist understanding of the embodiments an example installation 'job' which may be assisted by the wearable computing device is described. The example lighting unit installation 'job' may have or comprise a determined sequence of activities of 1a identify lighting unit
1b select/pick up lighting unit
2a climb from 'ground' to desired lighting location
2b mechanically locate the lighting unit within the structure
2c electrically locate the lighting unit within the structure
2d activate the lighting unit
2e descend to 'ground'

Activities 1a and 1b may for example be considered be progress or status positions or points within a meta-activity of 'identifying and selecting the next lighting unit'. Activities 2a to 2e may be considered to be progress or status positions or points within a meta-activity of 'installing the selected lighting unit'. These activities may be repeated until all of the lighting units have been installed.

For this example the processor 15 operating as a controller may be configured to receive sensor information to identify when an activity has been reached. Furthermore in some embodiments more than one type of sensor may be used to identify an activity. For example the activity 1a identify lighting unit may be identified by the camera identifying lighting unit tags, activity 1b select/pick up lighting unit may be identified based on the pressure sensors in the gloves indicating that the user is holding the lighting unit (object) to be installed. The determination or identification of the activity having been reached may be determined based on the defined activity order or on any suitable order. Furthermore the defined activity order may be a strictly one-to-one (sequential) flow, a one-to-many flow, or a many-to-one flow. For example a one-to-one flow may be shown where the processor may be configured to enable and check the activity 2b is identified (mechanically locating the lighting unit within the structure) then to check only for the activity 2c (electrically locate the lighting unit within the structure). However a one-to-many flow may be an example where the operations of mechanically and electrically locating the lighting unit within the structure may be performed in any order the processor may be configured to enable and check for either the activity 2b is identified (mechanically locating the lighting unit within the structure) or the activity of 2c (electrically locate the lighting unit within the structure) following identifying the activity of 2a (that the user has climbed from the 'ground' to the desired lighting location).

Furthermore in some embodiments the processor 15 may be configured to select and control based on the activity, the output of the contextual information. The control may for example be to control the type of contextual information being output from the output device to a user to assist the user in performing the identified activity (or in other words to move onto or reach the following activity within the sequence of activities). For example after the activity 'identify lighting unit' is completed the contextual information to be output may be information to the user to assist selection or picking of a suitable lighting unit from a set of all identified lighting units (identified objects). Whereas after the activity 'select/pick up lighting unit' is completed the contextual information to be output may be a lighting plan indicating where the selected lighting unit is to be installed and thus indicate where the user should move the ladder/movable platform to start the installation activity and so to start to reach the activity 2a.

Furthermore the processor may be configured to select and control the output device 13 (for example the see-through display 33, the audio transducer 31 or tactile transducer 35) used to provide the contextual information to the user to assist the user in performing the activity based on the determined activity within the sequence.

The processor may be further configured to control other parameters of the outputting of the contextual information, such as controlling the speed of the output or pausing the output. For example where the contextual information is a tutorial showing how to install the lighting unit the processor 15 may be configured to control the speed of the tutorial to the current based on the status or progress of the current activity, for example showing the mechanical aspects of the tutorial until the activity 2b (mechanically locate the lighting unit within the structure) is completed/reached, and then showing or forwarding the electrical aspect of the installation tutorial until the activity 2c (electrically locate the lighting unit within the structure) is completed/reached. The processor 15 may furthermore be able to identify and focus on elements or parts of the contextual information based on the identified activity or the progress of the activity being performed. For example a complex installation diagram can be zoomed into to display a required section or part based on a determined activity. Similarly the processor may be configured to control the flow direction of contextual information based on the identified activity.

The wearable computing device 1 as described herein is configured to be used to assist a sequence of activities. The sequence of activities can be any suitable mechanical, electrical, or plumbing operation such as installing a mechanical, electrical or plumbing system, maintaining or preparing a mechanical, electrical or plumbing system, or dismantling or removing a mechanical at call or plumbing system. In other words in the context of the present invention a sequence of activities can be any arrangement of steps or processes which are to be completed to finish a 'job' or procedure. Thus for example some examples can be connecting a device or system, wiring a device or system, configuring a device or system, assembling a device or system, disassembling a device or system, powering a device or system, controlling a device or system, or linking a device or system to a network.

Figure 2:
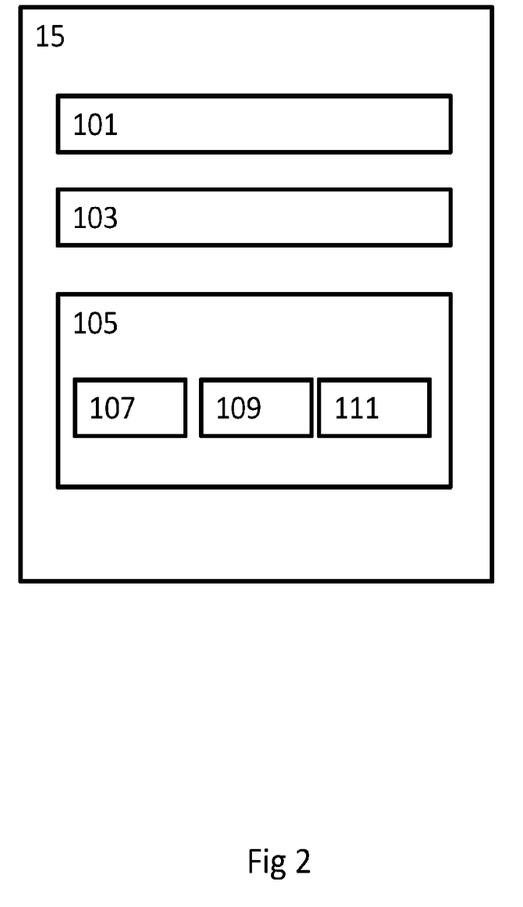
FIG. 2 shows an example computing device processor operating as a controller according to some embodiments.

With respect to FIG. 2 an example processor 15 is shown in further detail with respect to operational modules suitable for implementing some embodiments. The operational modules as shown herein with respect to the processor 15 may represent computer code, programs or parts of computer code or programs stored within the memory 19 and implemented or executed within the processor 15. However it would be understood that in some embodiments at least one of the operational modules may be implemented separately from the processor 15 or the processor 15 represents more than one processor core processor core configured to perform the operational module. The processor 15 in some embodiments may comprise an object identifier 101. The object identifier 101 in some embodiments is configured to receive the sensor information from the at least one sensor and determine or identify an object from the sensor information. As described herein the object identifier 101 may be configured to detect or determine tags on the objects and identify the object associated with the tag. For example the object identifier 101 may be configured to map the tag to an object identifier (and/or specific activity and/or sequence or progress or status of the activity on which the object is able to play a role). In other embodiments this identification may be performed according to any known manner including pattern recognition of sensor information, conditional or memory based pattern recognition, regression processing of sensor information, Neural network analysis of sensor information, etc. In the example given above with respect to the lighting system installation the object identifier 101 may be configured to receive the camera sensor information and identify and map QR codes on the lighting units within the field of view of the user to identify which lighting units are available and to activities which may be performed with the identified lighting units.

The processor 15 may further comprise an activity identifier 103. The activity identifier 103 in some embodiments is configured to receive the sensor information and determine or identify the activity being performed (and furthermore the progress of the activity within the sequence of activities). It would be understood that in some embodiments the activity identifier 103 is further configured to further determine the current sequence of activities being performed and having determined the sequence then determine the activity from the sequence. In some embodiments the activity identifier 103 is configured to map or associate information from the sensor input signals to a specific activity. This may be performed according to any known manner including pattern recognition of sensor information, conditional or memory based pattern recognition, regression processing of sensor information, Neural network analysis of sensor information, etc. In the example given above with respect to the lighting system installation the activity identifier 103 may be configured to receive the atmospheric pressure sensor information and identify the activity 2a climb from 'ground' to desired lighting location, when the height value is equal to or greater than a determined threshold value. Similarly the activity identifier 103 may be configured to receive microphone sensor signals and identify the activity, 2b mechanically locate the lighting unit within the structure when a mechanical click is detected. Furthermore the activity identifier 103 may be configured to receive microphone sensor signals and identify the activity 2c electrically locate the lighting unit within the structure when detecting an electrical connection click which is different from the mechanical locating noise. Furthermore the activity identifier 103 may be configured to receive camera sensor signals and identify the activity, 2d activate the lighting unit when an activation light illuminated on the lighting unit is detected. The activity identifier 103 may then be furthermore configured to receive the atmospheric pressure sensor information and identify the activity 2e descend to 'ground', when the height value is less than to or greater than the determined threshold value or other value. As described herein the identification of activities may be performed by attempting to identify a 'next' activity as defined according to a defined ordering of activities within an activity or sequence of activities or attempting to identify any activity or the progress of any activity within the defined sequence.

The processor 15 may further comprise a contextual information controller 105. The contextual information controller 105 may be configured to receive the identified activity (and furthermore in some embodiments, the progress of the activity within the identified sequence of activities) and based on this input determine suitable contextual information to be output via a selected output device. In some embodiments contextual information controller 105 may be configured to apply a look up table which has multiple entries and generate or output control values indicating which data and the output device to be provided based on the entry value representing the progress or status of the activity (and in some embodiments based on an identified object being used in the identified activity). For example in some embodiments the contextual information provider may comprise a contextual information filter 107. The contextual information filter 107 may receive information associated with the identified sequence of activities (and/or the identified activity) and be configured to filter this information based on the determined or identified activity to be performed. The information may be retrieved or received either from data storage 19 within the wearable computing device 1 or as described herein from an external devices such as server 9 or any other suitable storage device external to the wearable computing device 1. The contextual information filter 107 may then be configured to output the filtered information. In an embodiment, the contextual information filter 107 may further filter the received information such that only information in a data format suitable for the selected output device is provided to the selected output device.

Using the lighting installation system example described above the information associated with the sequence of activities may include a range of differing types of information such as tutorials on how to install a particular lighting unit, information of the lighting unit plan and other supporting information about the lighting units. The contextual information filter 107 may be configured to filter this information such that the output contextual information is a tutorial on how to install a particular lighting unit to assist the user to reach the installation activities and to filter the information such that the output contextual information is the lighting plan information enabling the user to select the next lighting unit to assist the user to reach the 1b selection/pick up lighting unit activity.

The contextual information controller 105 in some embodiments may comprise an information speed controller 109. The information speed controller 109 may be configured to determine the speed at which the contextual information is output based on the identified activity or the progress of the activity.

The contextual information controller 105 in some embodiments may comprise an information flow direction controller 111. The information flow direction controller 111 may be configured to control the flow of the contextual information based on the identified activity or the progress of the activity.

Figure 3:
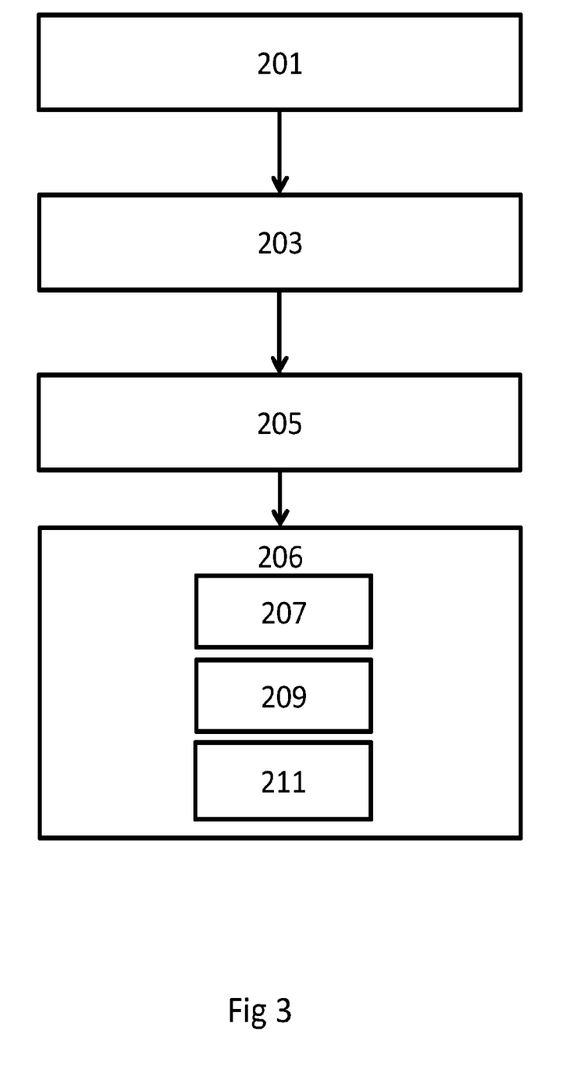
FIG. 3 shows a flow diagram of the operation of the example computing device according to some embodiments.

With respect to FIG. 3 an example flow diagram of the operation of the processor shown in FIGS. 1 and 2 according to some embodiments is described.

As indicated herein the processor may be configured to receive sensor information. The sensor information may for example be sensor information from integrated sensors and/or external sensors.

The operation of receiving sensor information is shown in FIG. 3 by step 201.

Furthermore the processor may optionally be configured to identify an object from the sensor information.

The operation of identifying the object from the sensor information is shown in FIG. 3 by step 203.

In some embodiments the processor may be configured to further identify an activity from the sensor information. Furthermore in some embodiments the processor may be configured to identify the sequence of activities from which the identified activity occurs or the activity progress.

The operation of identifying the activity is shown in FIG. 3 by step 205

The processor may in some embodiments be configured to control the output of information or contextual information based on the determined or identified activity.

The operation of controlling contextual information based on the determined or identified activity or the progress or status of the activity is shown in FIG. 3 by step 206.

The operation of controlling the contextual information may itself comprise selecting and controlling the information and in some embodiments selecting an output device from at least one output device to provide the contextual information to the user based on the determined or identified activity to assist the user in performing the activity.

The sub-operation of selecting and controlling the at least one output device to provide the contextual information is shown in FIG. 3 by step 207.

The operation of controlling the contextual information may itself comprise controlling the speed of the output contextual information provided to the user based on the determined or identified activity to assist the user in performing the activity.

The sub-operation of controlling the output speed is shown in FIG. 3 by step 209.

The operation of controlling the contextual information may itself comprise controlling the flow direction of the output contextual information provided to the user based on the determined or identified activity to assist the user in performing the activity.

The sub-operation of controlling the output flow direction is shown in FIG. 3 by step 211.

With respect to FIGS. 4a to 4d and 5 is shown a further example of embodiments with respect to a further lighting unit installation 'job' wherein the sensor information is that generated from microphone and camera sensors for the wearable computing device.

Figure 4A:
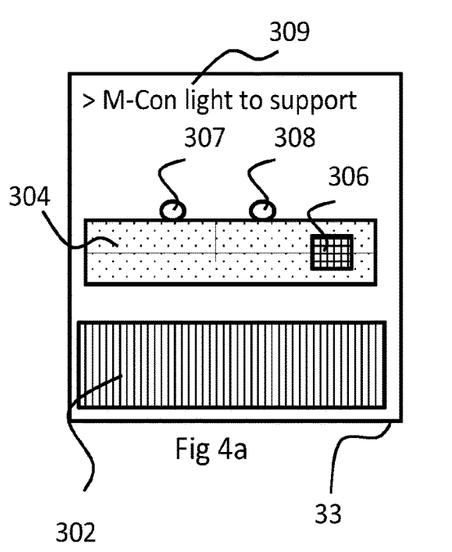
FIGS. 4a to 4d show an example scenario within which a computing device according to some embodiments can operate.

With respect to FIG. 4a, the field of view of the user wearing the wearable computing device is shown. The field of view shows the viewpoint of the user with the head mounted display 33 through which can be seen a representation of a lighting unit 304 comprising a suitable tag 306 configured to identify the lighting unit and furthermore diagnostic lights, such as activation light 307 and connection light 308, indicating whether the lighting unit is connected and activated. In FIG. 4a both lights are off indicating that the lighting unit is not connected and not activated. The field of view furthermore shows a mechanical and electrical support structure 302 configured to receive the lighting unit. The display 33 is furthermore shown to be configured to output an image, which in this example comprises a text instruction 309 'M-Con light to socket', or mechanically connect the light to socket, instructing the user what activity or task is to be performed next.

The user having received these instructions may then perform a mechanical light to support connection operation. This for example may produce a mechanical click as the light is mechanically inserted into the support. The click may be received by the microphone sensors and enable the processor to determine that the mechanical connection activity has been completed/reached. In some embodiments other sensors such as the camera may assist or be used to determine a mechanical connection has occurred. For example the support may significantly or completely disappear from view following the connection of the lighting unit with the support. This activity determination in turn enables the processor to change the contextual information output to the user, for example to display a message instructing the user to electrically connect the light to the support.

Figure 4B:
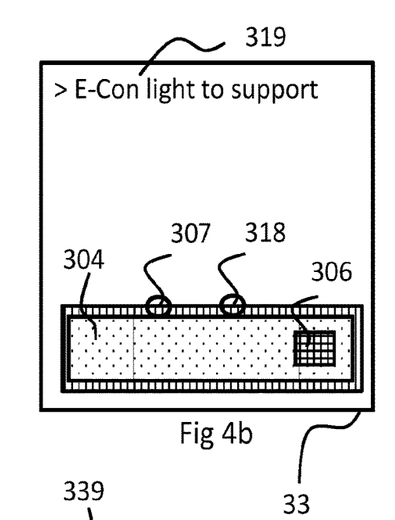

With respect to FIG. 4b, the field of view of the user wearing the wearable computing device is shown following the mechanical connection of the lighting unit 304 within the support structure 302. The display 33 is shown to be configured to output an image, which in this example comprises a text instruction 319 'E-Con light to socket', or electrically connect the light to socket.

The user having received these instructions may then perform an electrical light to support connection operation. This for example may produce a further click as the light is connected to the support. The click may be received by the microphone sensors. In some embodiments the camera may detect or determine a lit or illuminated connection light or other diagnostic indication, such as an audible 'beep' indicator. This sensor information enables the processor to determine that the electrical connection activity has been completed/reached. This determination in turn enables the processor to change the contextual information output to the user, for example to display a message instructing the user to activate the lighting unit.

Figure 4C:
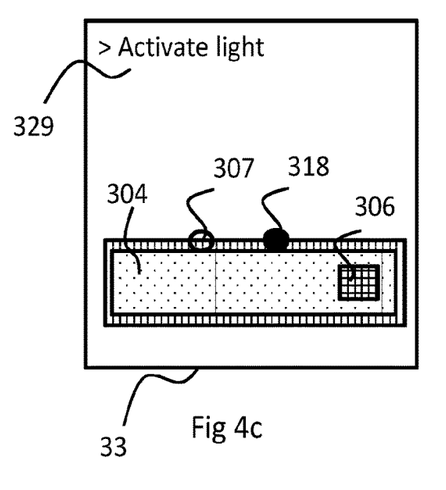

With respect to FIG. 4c, the field of view of the user wearing the wearable computing device is shown following the electrical connection of the lighting unit 304 within the support structure 302 and where the connection light is on 318 but the activation light is off 307 indicating the lighting unit is connected but not yet activated correctly. The display 33 is shown to be configured to output a further image, which in this example comprises a text instruction 329 'Activate light'.

The user having received these instructions may then activate the connected light unit, for example by switching it on. This for example may produce a further click as the switch is thrown. The click may be received by the microphone sensors. In some embodiments the camera may detect or determine a lit or illuminated activation light or other diagnostic indication, such as an audible 'beep' indicator. This sensor information enables the processor to determine that the activation connection activity has been completed/reached. This in turn enables the processor to change the contextual information output to the user, for example to display a message to the user that the lighting unit is correctly installed.

Figure 4D:
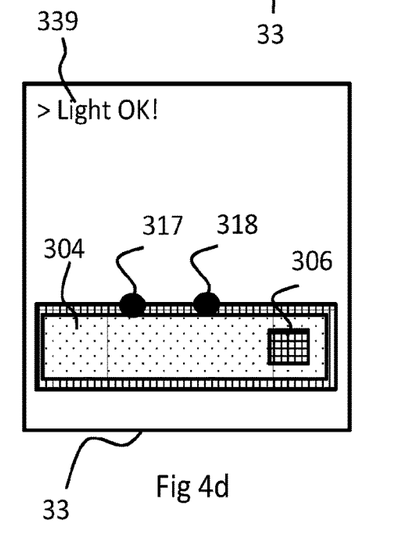

With respect to FIG. 4d, the field of view of the user wearing the wearable computing device is shown following the activation of the lighting unit 304 within the support structure 302 and where the connection light is on 318 and the activation light is on 317 indicating the lighting unit is connected and activated. The display 33 is shown to be configured to output a further image, which in this example comprises a text message 339 'Light OK!', indicating to the user that the light installation for this lighting unit is ok and to descend to start the process of identifying and selecting a further lighting unit.

Although in these examples the contextual information shown is an image comprising text based it is understood that the output may include or be audio or tactile outputs. For example the messages may be read to the user. Thus for example in some embodiments the output may be a different type 'audio' output to the sensor type 'video' input. With respect to FIG. 5 a flow diagram is shown of the operations of the wearable computing device according to the example shown in FIGS. 4a to 4d. The wearable computing device 1 for example may optionally be configured to identify the object in the form of the lighting unit 304 by the tag 306.

Figure 5:
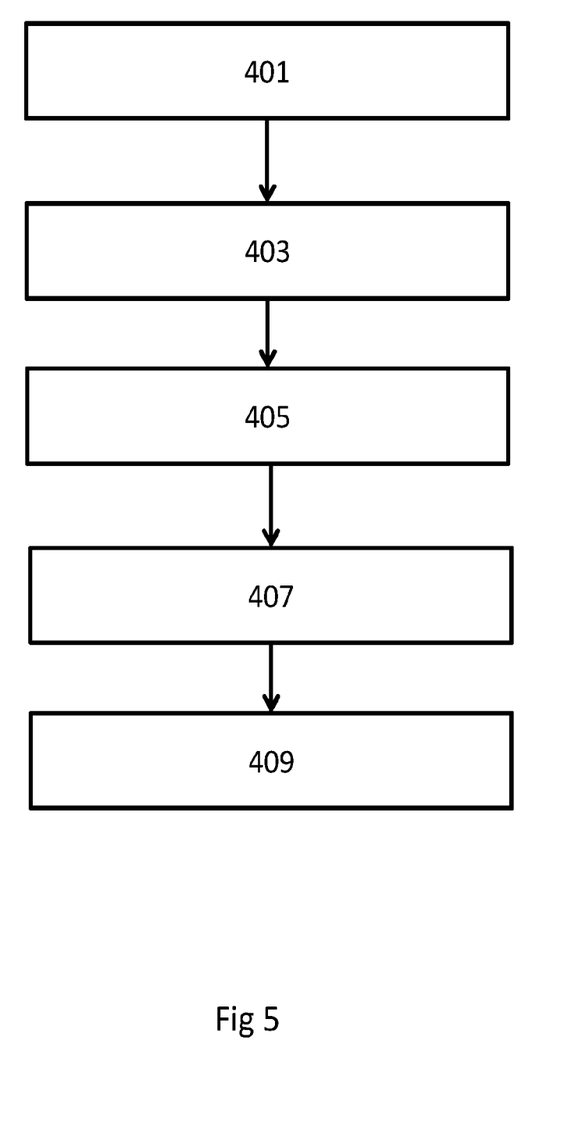
FIG. 5 shows a flow diagram of the example in FIGS. 4a and 4b according to some embodiments.

The operation of identifying the lighting unit as the object is shown in FIG. 5 by step 401.

Furthermore the camera image may comprise the 'feature' of the support structure and as such the processor may determine or identify the activity of having reached the correct location but not having mechanically or electrically connected the lighting unit within the support structure.

The operation of identifying the activity (for the object) is shown in FIG. 5 by 403.

The wearable computing device 1 may then be configured to control the information received or stored on the wearable computing device such that it generates or filters information about the correct placement or installation tutorial of the selected light fitting based on having identified the activity being that of not yet having reached the mechanical or electrical connection activity. For example the output may be an image and text message instruction detailing the next step to take.

The operation of selecting and controlling the contextual information based on the identified activity is shown in FIG. 5 by 405.

The user, having been provided with instructions on how to mechanically and electrically install the lighting unit, may then place and connect mechanically and electrically the lighting unit within the support structure. This may then cause the connection light to illuminate as shown in FIG. 4c. The camera image comprising the field of view of the user comprising the illuminated light may then be detected by the processor which determines or identifies that the progress or status of the installation activity has reached the point of mechanical and electrical connection has been made.

The operation of determining the next activity has been reached based on the camera sensor detecting the illuminated light is shown in FIG. 5 by step 407.

The wearable computing device 1 can then be configured to control the information received or stored on the wearable computing device 1 such that it generates or filters information on how to activate the light, and displays either visually or audibly a tutorial or instruction on how to activate the selected lighting unit. In such a manner the user is assisted in his activity as only the information required by the user is output in a manner that does not confuse or overwhelm the user.

The operation of selecting and controlling the contextual information to indicate how to activate the light based on the identified activity is shown in FIG. 5 by 409.

Although the embodiments and described examples have indicated that identified activity controls the output of contextual information associated with the identified activity or sequence of activities it would be understood that in some embodiments the identified activity may control all types of information output from the wearable computing device 1. For example other communication outputs may be controlled, for example setting the wearable computing device in a hands free mode, a silent mode, a call divert mode based on the determined interaction mode.

In some embodiments the processor may furthermore comprise a sequence verifier. The sequence verifier may be configured to determine or verify whether the activities within the sequence have been performed correctly by determining whether all of the activities has been completed in the correct order, or whether one of the activities have been missed. The automatic detection of the activities can therefore be used for testing purposes. For example has the device been wired properly? Is the device mounted with the correct orientation? In some embodiments the processor may be configured to provide an alarm signal where an activity has been missed or been completed in the incorrect order. In some embodiments an error may furthermore be configured to generate contextual information such as instructions on how to solve the detected issue. In some embodiments, the sequence verification step may be used to control the output of the contextual information by the selected output device, for instance as an alternative to the user input. The verified sequence for instance may be used to predict the appropriate contextual information for an expected next activity in the verified sequence, such that a user is not required to provide the user input, thereby improving the intuitive nature of the contextual information provisioning.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A computing device for controlling the output of contextual data to assist a user to perform a sequence of activities, the computing device comprising or coupled to at least one wearable sensor and at least one output device for providing contextual data;

wherein the computing device comprises:
an activity identifier-configured to receive at least one sensor input from the at least one wearable sensor, the sensor input comprising one of: a camera image, a microphone input, and an atmosphere pressure sensor input;
further configured to identify using the sensor input from the at least one wearable sensor, at least one of: (i) within the camera image a position or a feature of an object, (ii) within the audio signal an audio feature generated by the performing of an activity, and (iii) the user's height; and
a contextual information controller configured to receive said identified activity and; based on said identified activity elect an output device;
access at least one memory or a further device to retrieve contextual data for the identified activity; and
control the output of contextual data by the selected-output device to assist the user in performing the identified activity;
wherein the selected output device provides said output of contextual data; and
an object identifier configured to identify an object using the sensor input, wherein the activity identifier is configured to identify an activity involving the object and the contextual information controller is configured to select the output device and control the output of contextual data by the selected output device based on the identified activity involving the object.

2. The computing device as claimed in claim 1, wherein the object identifier is configured to determine a tag located on the object; and identify the object from the tag.

3. The computing device as claimed in claim 2, wherein the tag comprises one of: a QR code sticker; a barcode; a NFC tag.

4. The computing device as claimed in claim 1, wherein the activity identifier is configured to identify an activity process using said sensor input; and the contextual information controller is configured to select any output device and control the output of the contextual data by the selected output device to assist the user in performing the identified activity at least partly based on the identified activity progress.

5. The computing device as claimed in claim 1, wherein the sensor input further comprising one of: a gyroscope/compass sensor input; and a pressure or contact sensor input associated with a garment worn by a user.

6. The computing device as claimed in claim 1, wherein the sequence of activities is a lighting installation sequence of activities.

7. The computing device as claimed in claim 1, wherein the computing device is configured to receive the microphone input from more than one microphone, wherein the microphones are spatially arranged for capturing a directional audio signal.

8. A computing device for controlling the output of contextual data to assist a user to perform a sequence of activities, the computing device comprising or coupled to at least one wearable sensor and at least one output device for providing contextual data;
wherein the computing device comprises:
an activity identifier-configured to receive at least one sensor input from the at least one wearable sensor, the sensor input comprising one of: a camera image, a microphone input, and an atmosphere pressure sensor input;
further configured to identify using the sensor input from the at least one wearable sensor, at least one of: (i) within the camera image a position or a feature of an object, (ii) within the audio signal an audio feature generated by the performing of an activity, and (iii) the user's height; and
a contextual information controller configured to receive said identified activity and; based on said identified activity elect an output device;
access at least one memory or a further device to retrieve contextual data for the identified activity; and
control the output of contextual data by the selected-output device to assist the user in performing the identified activity;
wherein the selected output device provides said output of contextual data, wherein the contextual information controller is configured to select an output device and control the output of the contextual data by the selected output device further based on a user input.

9. The computing device as claimed in claim 8, wherein the contextual information controller is configured to at least one of: adapt an output speed of the contextual data; identify and focus on an element of the contextual data; and control the flow direction of the contextual data.

10. A computing device for controlling the output of contextual data to assist a user to perform a sequence of activities, the computing device comprising or coupled to at least one wearable sensor and at least one output device for providing contextual data;
wherein the computing device comprises:
an activity identifier-configured to receive at least one sensor input from the at least one wearable sensor, the sensor input comprising one of: a camera image, a microphone input, and an atmosphere pressure sensor input;
further configured to identify using the sensor input from the at least one wearable sensor, at least one of: (i) within the camera image a position or a feature of an object, (ii) within the audio signal an audio feature generated by the performing of an activity, and (iii) the user's height; and
a contextual information controller configured to receive said identified activity and; based on said identified activity elect an output device;
access at least one memory or a further device to retrieve contextual data for the identified activity; and
control the output of contextual data by the selected-output device to assist the user in performing the identified activity;
wherein the selected output device provides said output of contextual data, wherein the activity identifier is configured to: identify a feature or feature pattern from the at least one sensor; and use the identified feature or feature pattern to identify the activity.

11. A computing device for controlling the output of contextual data to assist a user to perform a sequence of activities, the computing device comprising or coupled to at least one wearable sensor and at least one output device for providing contextual data;
wherein the computing device comprises:
an activity identifier-configured to receive at least one sensor input from the at least one wearable sensor, the sensor input comprising one of: a camera image, a microphone input, and an atmosphere pressure sensor input;
further configured to identify using the sensor input from the at least one wearable sensor, at least one of: (i) within the camera image a position or a feature of an object, (ii) within the audio signal an audio feature generated by the performing of an activity, and (iii) the user's height; and
a contextual information controller configured to receive said identified activity and; based on said identified activity elect an output device;
access at least one memory or a further device to retrieve contextual data for the identified activity; and
control the output of contextual data by the selected-output device to assist the user in performing the identified activity;
wherein the selected output device provides said output of contextual data, further comprising a sequence verifier configured to test a correct performing of the sequence of activities by verifying a progression of activities within the sequence of activities.

12. A method for controlling the output of contextual data to assist a user to perform a sequence of activities using a computing device including a processor, the computing device comprising or coupled to at least one wearable sensor and at least one output device for providing contextual data, the method comprising, with said processor:

receiving sensor input from the at least one wearable sensor worn by said user, the sensor input comprising one of: a camera image, a microphone input, and an atmospheric pressure sensor input;

identifying, using said sensor input, at least one of: (i) within the camera image a position or a feature of an object, (ii) within the audio signal an audio feature generated by the performing of an activity, and (iii) a user's height based on the atmospheric pressure sensor input; and identifying an activity of said sequence being performed by the user by using at least one of: (i) the identified position or the identified feature, (ii) the identified audio feature, and (iii) the user's height; and, receive said identified activity and based on said identified activity:

selecting an output device;

accessing at least one memory or a further device to retrieve contextual data for the identified activity;

controlling the output of the contextual data by the selected output device to assist the user in performing the identified activity;

providing said output of contextual data with the selected output device;

filtering the retrieved contextual data as a function of the selected output device; and wherein the step of controlling the output of the contextual data by the selected output device comprises outputting the filtered contextual data with the selected output device to the user using the computing device.

13. A computer program product comprising a computer-readable medium embodying computer program code for implementing the steps of the method of claim 12 when executed on a processor of a computing device further comprising or coupled to at least one sensor and at least one output device for providing contextual data.

* * * * *